United States Patent
Jang et al.

(10) Patent No.: US 8,663,773 B2
(45) Date of Patent: Mar. 4, 2014

(54) VACUUM INSULATION PANEL AND METHOD FOR MANUFACTURING THE SAME

(75) Inventors: Suk Jang, Seoul (KR); Sung-Seock Hwang, Cheongju-si (KR); Seung-Min Jeon, Haeundae-gu Busan (JP); Myung Lee, Hwaseong-si (KR); Jung-Pil Han, Nam-gu Ulsan (KR)

(73) Assignee: LG Hausys, Ltd., Seoul (KR)

( * ) Notice: Subject to any disclaimer, the term of this patent is extended or adjusted under 35 U.S.C. 154(b) by 110 days.

(21) Appl. No.: 13/391,178

(22) PCT Filed: Jan. 4, 2011

(86) PCT No.: PCT/KR2011/000027
§ 371 (c)(1),
(2), (4) Date: Feb. 17, 2012

(87) PCT Pub. No.: WO2011/083948
PCT Pub. Date: Jul. 14, 2011

(65) Prior Publication Data
US 2012/0164365 A1      Jun. 28, 2012

(30) Foreign Application Priority Data
Jan. 5, 2010   (KR) .................. 10-2010-0000633

(51) Int. Cl.
*F16L 59/065*   (2006.01)
(52) U.S. Cl.
USPC ........................................................... 428/69
(58) Field of Classification Search
USPC ........................................................... 428/69
See application file for complete search history.

(56) References Cited

U.S. PATENT DOCUMENTS 5,858,501 A *   1/1999   Malone ............................ 428/71
6,938,968 B2 *   9/2005   Tanimoto et al. .............. 312/406
(Continued)

FOREIGN PATENT DOCUMENTS

| CN | 1425116 A | 6/2003 |
|---|---|---|
| CN | 1755309 A | 4/2006 |

(Continued)

OTHER PUBLICATIONS

Araki, K, et al; "Optimization about Multilayer Laminated Film and Getter Device Materials of Vacuum Insulation Panel for Using at High Temperature". Journal of Materials Processing Technology, 209(1), 271-282, (2009).

*Primary Examiner* — Alexander Thomas
(74) *Attorney, Agent, or Firm* — Nath, Goldberg & Meyer; Joshua B. Goldberg

(57) ABSTRACT

A vacuum insulation panel and to a method for manufacturing same. The method comprises: (a) a step of laminating a plurality of glass fiber boards to form a core, wherein the glass fiber boards are produced by a papermaking method using glass fiber dispersed in an inorganic binder; (b) a step of forming an outer cover having a structure in which a surface protection layer, a metal barrier layer, and an adhesive layer are laminated; (c) a step of producing a getter by packing quicklime (CaO) powder in a pouch; (d) a step of attaching the getter onto the core, or inserting the getter into the surface of the core; and (e) a step of forming the outer cover into a bag body, inserting the core from step (d) into the bag body, and sealing the bag body, thereby improving long-term durability of the vacuum insulation panel.

16 Claims, 3 Drawing Sheets

(56) References Cited

U.S. PATENT DOCUMENTS

| | | |
|---|---|---|
| 2004/0180176 A1 | 9/2004 | Rusek, Jr. |
| 2005/0175809 A1* | 8/2005 | Hirai et al. .................. 428/69 |
| 2007/0059499 A1* | 3/2007 | Yuasa et al. .................. 428/198 |

FOREIGN PATENT DOCUMENTS

| | | |
|---|---|---|
| CN | 101046271 A | 10/2007 |
| CN | 101086316 A | 12/2007 |
| EP | 1 275 893 A1 | 1/2003 |
| JP | 09-145239 A | 6/1997 |
| JP | 09-262462 A | 10/1997 |
| JP | H10318666 | 12/1998 |
| JP | 2005337405 | 12/2005 |
| JP | 2005344900 | 12/2005 |
| JP | 2006-029686 A | 2/2006 |
| JP | 2006194297 | 7/2006 |
| JP | 2007-297256 A | 11/2007 |
| JP | 2008215538 | 9/2008 |
| JP | 2009162267 | 7/2009 |
| JP | 2009210072 | 9/2009 |
| KR | 10-2009-0031601 A | 3/2009 |

* cited by examiner

VACUUM INSULATION PANEL AND METHOD FOR MANUFACTURING THE SAME

This is a National Phase Application filed under 35 U.S.C. 371 as a national stage of PCT/KR2011/000027, filed Jan. 4, 2011, and claims priority benefit from Korean Application No. 10-2010-0000633, filed Jan. 5, 2010, the content of each of which is hereby incorporated by reference in its entirety.

TECHNICAL FIELD

The present invention relates to a vacuum insulation panel and a method for manufacturing the same, and more particularly to technology for manufacturing a vacuum insulation panel with improved long term durability and low thermal conductivity through reconstruction of materials and the interlayer structure of a core, an outer layer and a getter constituting the vacuum insulation panel.

BACKGROUND ART

Generally, a vacuum insulation panel includes an encapsulant comprised of a composite plastic laminate film exhibiting good gas barrier properties, a core received in the encapsulant and comprised of a continuous bubble hard plastic foam or inorganic material, and gas barrier films stacked along the rim of the panel and heated to seal the panel after decompression of the panel.

Generally, a vacuum insulation panel allows air or moisture to pass through the encapsulant or carbon dioxide or other gas is generated therein, so that the degree of vacuum is gradually reduced over time to increase thermal conductivity, thereby making it difficult to maintain a high degree of insulation.

To solve such problems, a conventional vacuum insulation panel includes a core made of a mixture of an organic binder and glass fiber.

Further, as to the core of the vacuum insulation panel, a binder-free glass wool type core is prepared through heat compression without using a binder, or a binder glass wool type core is prepared through surface hardening with a binder.

The binder-free glass wool type core exhibits good initial thermal conductivity, but has insufficient long term durability due to an undulating surface formed upon processing of the vacuum insulation panel.

The binder glass wool type core has a flat surface, but exhibits low initial thermal conductivity and long term durability.

An outer cover for the vacuum insulation panel is generally made of a typical material for vacuum packaging, which has a laminate structure of a surface protective layer, a metal barrier layer and an adhesive layer.

The vacuum insulation pad is likely to undergo deterioration in performance due to cracking of the metal barrier layer at a folded portion of the outer cover upon processing of the vacuum insulation panel.

The getter is made of a material capable of absorbing only moisture or both gas and moisture, and serves to maintain the degree of vacuum within the vacuum insulation panel through absorption capability and the amount of the material provided.

As such, conventionally, vacuum insulation panels are manufactured using a binder-free glass wool type core or a glass wool type core subjected to surface treatment with an inorganic binder, an outer cover prepared by stacking an Al foil and an organic film, and getters capable of absorbing moisture and gas.

Such a conventional vacuum insulation panel has a lifetime of 8 years or less under conditions of 0.010 Kcal/mhr° C., causing low reliability not only in the field of buildings requiring a lifespan of 10 years or more, but also in the field of electronic appliances.

DISCLOSURE

Technical Problem

The present invention provides a method of manufacturing a vacuum insulation panel, by which a core is formed using glass fiber and an inorganic binder through a papermaking process to have good insulation properties, an outer cover is coated with a vinyl-based resin to improve gas barrier and shielding properties, and getters are formed of lime powder to maximize absorption capabilities.

The present invention also provides a vacuum insulation panel which has a long term durability of at least 10 years or more through optimization of all factors as described above.

Technical Solution

An aspect of the present invention provides a method of manufacturing a vacuum insulation panel which includes: (a) forming a core by stacking a plurality of glass fiber boards prepared using glass fiber dispersed in an inorganic binder through a papermaking process; (b) forming an outer cover having a laminate structure of a surface protective layer, a metal barrier layer and an adhesive layer; (c) forming a getter by packaging quicklime (CaO) powder in a pouch; (d) attaching the getter to an upper side of the core or inserting the getter into the core; and (e) forming an encapsulant using the outer cover, followed by placing the core having the getter in the encapsulant and sealing the encapsulant, with a vacuum created in the encapsulant.

The glass fiber may include staples having a diameter of 0.1 to 10 μm. The inorganic binder may be water glass comprised of water, silica powder and sodium hydroxide (NaOH). Further, each of the glass fiber boards may have a thickness of 4 to 10 mm, and 1 to 3 glass fiber boards are stacked to form the core.

Next, the surface protective layer of the outer cover may have a laminate structure of polyethyleneterephthalate (PET) and Nylon films, in which an upper side of the polyethyleneterephthalate (PET) film is coated with a vinyl-based resin comprising at least one selected from the group consisting of polyvinyl chloride (PVC), polyvinyl acetate (PVA), polyvinyl alcohol (PVAL), polyvinyl butyral (PVB), and polyvinylidene chloride (PVDC) resins.

Further, the metal barrier layer of the outer cover may include an aluminum (Al) foil. The adhesive layer of the outer cover may include at least one plastic film selected from the group consisting of high density polyethylene (HDPE), low density polyethylene (LDPE), linear low density polyethylene (LLDPE), cast polypropylene (CPP), oriented polypropylene (OPP), polyvinylidene chloride (PVDC), polyvinyl chloride (PVC), ethylene-vinyl acetate copolymer (EVA), and ethylene-vinyl alcohol copolymer (EVOH) films. Here, the surface protective layer, the metal barrier layer and the adhesive layer of the outer cover may be bonded to each other using a polyurethane (PU) resin.

The quicklime (CaO) may have a purity of 95% or more, and the pouch may be made of crepe paper and polypropylene (PP) impregnated non-woven fabrics.

The encapsulant having the core received therein may be evacuated to a vacuum of 0.1 to 10 Pa.

Another aspect of the present invention provides a vacuum insulation panel manufactured by the method described above and including a core, a getter and an outer cover.

The core may include pores having a diameter of 20 μm or less and may have a porosity of 80% or more. The getter may have a moisture absorption rate of 25% or more, and the vacuum insulation panel may have a predicted thermal conductivity of 0.006 Kcal/mhr° C. or less after 10 years.

A further aspect of the present invention provides a vacuum insulation panel which includes: a core including a plurality of glass fiber boards stacked one above another and prepared using glass fiber dispersed in an inorganic binder through a papermaking process; a getter attached to an upper portion of the core or inserted into the core, and formed by packaging quicklime (CaO) powder in a pouch; and an outer cover having a laminate structure of a surface protective layer, a metal barrier layer and an adhesive layer, and sealing outer surfaces the core and the getter in a vacuum.

Advantageous Effects

In a method for manufacturing a vacuum insulation panel according to exemplary embodiments, a core having a porosity of 80% or more and a pore diameter of 20 μm or less is used, thereby providing maximized insulation effects.

In addition, in the method according to the exemplary embodiments, a vinyl-based resin is coated on the top of a surface protective layer of an outer cover, thereby preventing defects caused by an Al foil while improving gas barrier and shielding properties.

Further, in the method according to the exemplary embodiments, a getter is prepared using high purity quicklime powder to guarantee a moisture absorption rate of 25% or more with a small amount, thereby preventing undulation of the panel surface.

Furthermore, vacuum insulation panels prepared by the method according to exemplary embodiments may have a long term durability of 10 years or more.

BEST MODE

Figure 1:
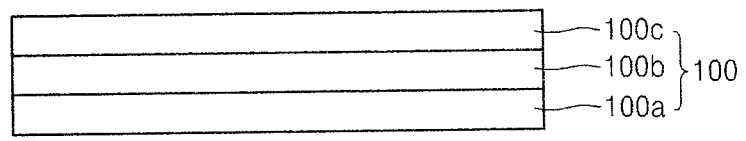
FIG. 1 is a sectional view of a core of a vacuum insulation panel in accordance with an exemplary embodiment of the present invention.

The present invention is directed to optimizing not only a core but also an outer cover and a getter to manufacture a vacuum insulation panel having excellent long term durability.

Exemplary embodiments of the present invention will now be described in detail with reference to the accompanying drawings.

The above and other aspects, features, and advantages of the invention will become apparent from the following detailed description of exemplary embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is limited by the accompanying claims and equivalents thereof. Like elements will be indicated by like reference numerals throughout the specification.

In a method for manufacturing a vacuum insulation panel according to an exemplary embodiment, a core is formed by stacking a plurality of glass fiber boards, which are prepared using glass fiber dispersed in an inorganic binder through a papermaking process.

Then, an outer cover having a laminate structure of a surface protective layer, a metal barrier layer and an adhesive layer is formed.

Next, a getter is prepared by packaging quicklime (CaO) powder in a pouch.

Then, the getter is attached to an upper portion of the core or is inserted into the core, and an encapsulant is formed using the outer cover, followed by placing the core having the getter in the encapsulant and sealing the encapsulant in a vacuum, thereby completing a vacuum insulation panel.

Hereinafter, the process of forming the core and a detailed configuration of the core will be described.

FIG. 1 is a sectional view of a core of a vacuum insulation panel in accordance with an exemplary embodiment of the present invention Referring to FIG. 1, three glass fiber boards 100a, 100b, 100c each having a thickness of 4 to 10 mm are stacked to prepare a core 100.

Here, the glass fiber boards 100a, 100b, 100c are prepared by dispersing glass fiber in an inorganic binder. The glass fiber may include staples having a diameter of 0.1 to 10 μm.

The inorganic binder may be water glass comprised of water, silica powder and sodium hydroxide (NaOH).

Here, a papermaking process may be used to provide a glass fiber board having a porosity of 80% or more and exhibiting good insulation properties. Further, if the diameter of the glass fiber is less than 0.1 μm, there is a possibility of forming a glass fiber board having an abnormal shape, and if the diameter of the glass fiber exceeds 10 μm, the glass fiber board has a pore diameter exceeding 20 μm, thereby deteriorating insulation properties.

According to the present invention, the papermaking process includes stirring the glass fiber in the inorganic binder, forming a board using a mixture of the inorganic binder and the glass fiber, dehydrating the board using a press roller, heating the dehydrated board using hot air to provide a glass fiber board, and cutting the glass fiber board to a desired size.

Then, an outer cover used for manufacturing an encapsulant for enclosing the core is formed. The shape and manufacturing process thereof will be described hereinafter.

Figure 2:
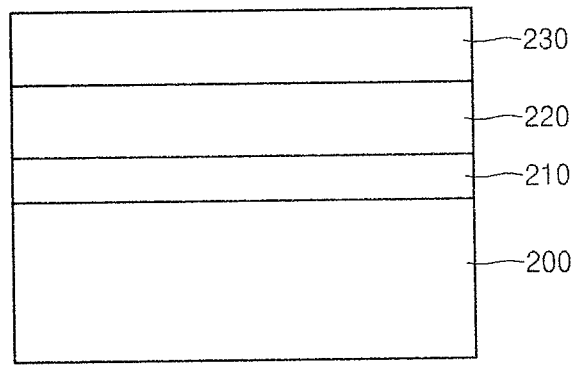
FIG. 2 is a sectional view of an outer cover of the vacuum insulation panel in accordance with the exemplary embodiment of the present invention.

FIG. 2 is a sectional view of the outer cover of the vacuum insulation panel in accordance with the exemplary embodiment of the present invention;

Referring to FIG. 2, a metal barrier layer 210 and surface protective layers 220, 230 are sequentially formed on an adhesive layer 200.

Here, the adhesive layer 200 may be thermally fused to each other by heat sealing and serve to maintain a vacuum. Thus, the adhesive layer 200 may be formed of at least one thermoplastic film, which facilitates thermal fusion and is selected from the group consisting of high density polyethylene (HDPE), low density polyethylene (LDPE), linear low density polyethylene (LLDPE), cast polypropylene (CPP), oriented polypropylene (OPP), polyvinylidene chloride (PVDC), polyvinyl chloride (PVC), ethylene-vinyl acetate copolymer (EVA), and ethylene-vinyl alcohol copolymer (EVOH) films. The adhesive layer 200 may have a thickness of 1 to 100 μm to provide sufficient sealing properties.

Then, a 6 to 7 μm thick metal thin film is formed on the adhesive layer 200 to act as the metal barrier layer 210 for blocking gas and protecting the core. An Al foil is generally used as the metal barrier layer 210. Since no thin film exhibiting superior properties to the Al foil has been found, the Al foil is used for the metal barrier layer 210 in this embodiment. Since Al may cause cracking of the metal barrier layer when the outer case is folded, the surface protective layers 220, 230 are formed on the metal barrier layer 210 to prevent the metal barrier layer from cracking.

According to this embodiment, the surface protective layer of the outer cover may be formed by stacking a 10 to 14 μm thick polyethylene terephthalate (PET) film 220 and a 20 to 30 μm thick Nylon film 230. In this case, when the metal barrier layer 210 undergoes severe cracking, the polyethylene terephthalate/Nylon films can also be damaged. Thus, according to the embodiment, a vinyl-based resin layer is coated on an upper side of the polyethylene terephthalate layer.

Figure 3:
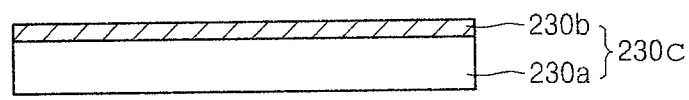
FIG. 3 is a sectional view of a coating layer of an outer cover of the vacuum insulation panel in accordance with the exemplary embodiment of the present invention.

FIG. 3 is a sectional view of a coating layer of the outer cover of the vacuum insulation panel in accordance with the exemplary embodiment.

Referring to FIG. 3, a polyethylene terephthalate layer 230a and a vinyl-based resin layer 230b are formed as an outermost layer 230c of the outer cover. The vinyl-based resin layer may be comprised of at least one selected from the group consisting of polyvinyl chloride (PVC), polyvinyl acetate (PVA), polyvinyl alcohol (PVAL), polyvinyl butyral (PVB), and polyvinylidene chloride (PVDC) resins.

In order to provide further improved sealing properties of the outer cover, the surface protective layers, the metal barrier layer and the adhesive layer may be bonded to each other using a polyurethane (PU) resin.

The outer cover prepared by the method according to this embodiment may provide optimized sealing properties and long term durability to the vacuum insulation pad.

On the other hand, gas or moisture can be generated inside the outer cover due to variation of external temperature. Thus, the getter is used to prevent this phenomenon. Now, the getter according to an exemplary embodiment of the invention will be described.

Figure 4:
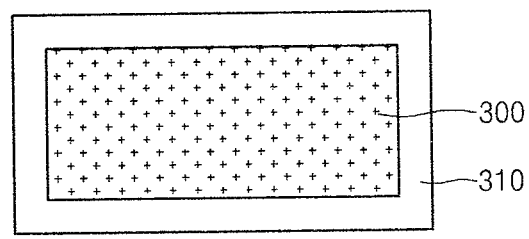
FIG. 4 is a plan view of a getter in accordance with an exemplary embodiment of the present invention.

FIG. 4 is a plan view of a getter in accordance with an exemplary embodiment of the present invention.

Referring to FIG. 4, quicklime (CaO) 300 is received in a pouch 310. In this embodiment, quicklime powder having a purity of 95% or more is used, and the pouch 310 is made of crepe paper and polypropylene (PP) impregnated non-woven fabrics to guarantee a moisture absorption rate of 25% or more. Here, the getter may have a thickness of 2 mm or less in consideration of the overall thickness of the vacuum insulation pad.

As described above, the vacuum insulation pad according to the present invention is manufactured by assembling the core, the outer cover and the getter prepared as described above.

First, an encapsulant is prepared using the outer cover and is sealed in a vacuum, with the core placed in the encapsulant. Here, the getter may be attached to the surface of the core or embedded in the core, as shown in FIGS. 5 and 6 described below.

The encapsulant may be evacuated to a vacuum of 0.1 to 10 Pa. If the degree of vacuum inside the encapsulant is less than 0.1 Pa, there is deterioration in production efficiency, and if the degree of vacuum exceeds 10 Pa, initial heat performance and long term durability can be lowered.

Figure 5:
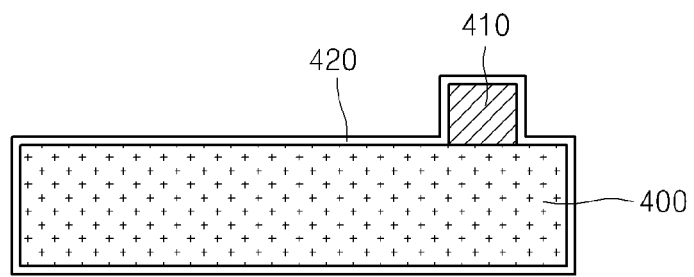
FIGS. 5 and 6 are sectional views of vacuum insulation panels and a method for manufacturing the same, in accordance with exemplary embodiments of the present invention.
Figure 6:
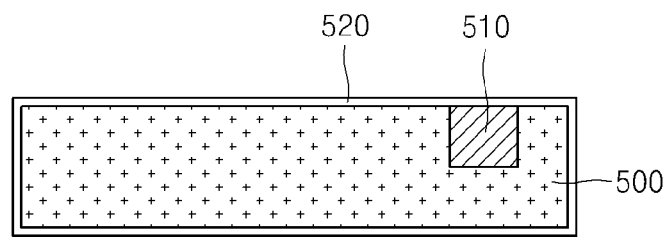

FIGS. 5 and 6 are sectional views of vacuum insulation panels and a method for manufacturing the same, in accordance with exemplary embodiments of the present invention.

FIG. 5 shows a vacuum insulation panel sealed using an outer cover 420, with a getter 410 attached to the surface of a core 400, and FIG. 6 shows a vacuum insulation panel using an outer cover 520 with a getter 510 inserted into a core 500.

The vacuum insulation panel prepared as described above exhibits excellent long term durability. Examples of the vacuum insulation panel will be described as follows.

EXAMPLES 1 and 2

First, one to three 10×300×400 mm (thickness×width×length) glass fiber boards, as shown in FIG. 1, were stacked to form a core.

Example 1 was prepared using a single glass fiber board, and Example 2 was prepared using three glass fiber boards.

Then, an encapsulant was formed to have a laminate structure of a 12 μm thick polyvinylidene chloride (PVDC)/polyethylene terephthalate (PET) film, a 25 μm thick Nylon film, a 6 μm thick Al foil, and a 50 μl thick linear low density polyethylene (LLDPE) film.

Next, two getters each including a pouch containing 25 g of quicklime (CaO) having a purity of 95% were inserted into the core, as shown in FIG. 6.

Then, the core was placed in the encapsulant, which in turn was sealed under a vacuum of 10 Pa, thereby providing a vacuum insulation panel.

COMPARATIVE EXAMPLES 1 and 2

One to three 10×300×400 mm (thickness×width×length) binder glass wool type glass fiber boards were stacked to form a core.

Comparative Example 1 was prepared using a single glass fiber board, and Comparative Example 2 was prepared using three glass fiber boards.

Then, an encapsulant was formed to have a laminate structure of a 12 μm thick polyethylene terephthalate (PET) film, a 25 μm thick Nylon film, a 7 μm thick Al foil, and a 50 μm thick linear low density polyethylene (LLDPE) film.

Next, two getters each including a pouch containing 25 g of quicklime (CaO) having a purity of 95% were inserted into the core, as shown in FIG. 6.

Then, the core was placed in the encapsulant, which in turn was sealed under a vacuum of 10 Pa, thereby providing a vacuum insulation panel.

COMPARATIVE EXAMPLES 3 and 4

One to three 10×300×400 mm (thickness×width×length) glass fiber boards, as shown in FIG. 1, were stacked to form a core.

Comparative Example 3 was prepared using a single glass fiber board, and Comparative Example 4 was prepared using three glass fiber boards.

Then, encapsulants according to Comparative Examples 3 and 4 were the same as in Examples 1 and 2 except that these encapsulants did not include a Nylon film as the surface protective layer.

Next, two getters each including a pouch containing 25 g of quicklime (CaO) having a purity of 95% were inserted into the core as shown in FIG. 6.

Then, the core was placed in the encapsulant, which in turn was sealed under a vacuum of 10 Pa, thereby providing a vacuum insulation panel.

COMPARATIVE EXAMPLES 5 and 6

One to three 10×300×400 mm (thickness×width×length) glass fiber boards, as shown in FIG. 1, were stacked to form a core.

Comparative Example 5 was prepared using a single glass fiber board, and Comparative Example 6 was prepared using three glass fiber boards.

Then, encapsulants according to Comparative Examples 5 and 6 were the same as in Examples 1 and 2 except that these encapsulants did not include a PVDC coating layer and a PET film as the surface protective layers.

Next, two getters each including a pouch containing 25 g of quicklime (CaO) having a purity of 95% were inserted into the core as shown in FIG. 6.

Then, the core was placed in the encapsulant, which in turn was sealed under a vacuum of 10 Pa, thereby providing a vacuum insulation panel.

Performance Test and Evaluation

Each of the vacuum insulation panels according to the examples and the comparative examples were placed in a constant temperature chamber at 85° C. and left for 10 days. Then, thermal conductivity of the panels was compared with those not subjected to heating. Here, thermal conductivity was measured using an HC-074·300 (manufactured by Eco Seiki). Then, thermal conductivity of the panels after 0 to 10 years was predicted by applying an acceleration factor. Results are shown in Table 1 and FIG. 7.

TABLE 1

| | Thermal conductivity (Kcal/mhr ° C.) | | | | | |
|---|---|---|---|---|---|---|
| | Initial | 2 years | 4 years | 6 years | 8 years | 10 years |
| Example 1 | 0.0030 | 0.0038 | 0.0042 | 0.0044 | 0.0058 | 0.0060 |
| Comparative Example 1 | 0.0031 | 0.0040 | 0.0061 | 0.0075 | 0.0095 | 0.0100 |
| Example 2 | 0.0030 | 0.0037 | 0.0042 | 0.0044 | 0.0058 | 0.0060 |
| Comparative Example 2 | 0.0032 | 0.0044 | 0.0060 | 0.0073 | 0.0095 | 0.0100 |
| Comparative Example 3 | 0.0031 | 0.0042 | 0.0045 | 0.0050 | 0.0061 | 0.0071 |
| Comparative Example 4 | 0.0030 | 0.0040 | 0.0046 | 0.0049 | 0.0059 | 0.0070 |
| Comparative Example 5 | 0.0030 | 0.0045 | 0.0052 | 0.0061 | 0.0069 | 0.0083 |
| Comparative Example 6 | 0.0032 | 0.0042 | 0.0049 | 0.0058 | 0.0072 | 0.0087 |

Figure 7:
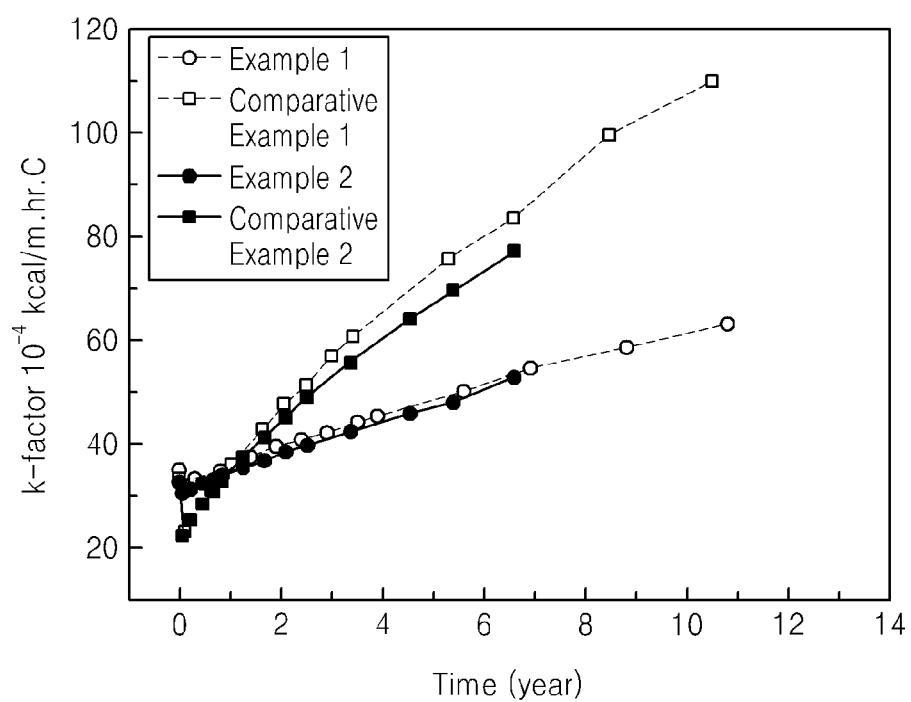
FIG. 7 is a graph depicting long term durability of vacuum insulation panels according examples and comparative examples.

FIG. 7 is a graph depicting long term durability of vacuum insulation panels according to the examples and Comparative examples 1 and 2.

As shown in Table 1 and FIG. 7, it could be seen that thermal conductivity of Comparative Examples 1 and 2 rapidly increased with increasing time, whereas thermal conductivity of Examples 1 and 2 gradually increased with increasing time.

Further, in terms of thermal conductivity after 10 years, Example 1 had a thermal conductivity of 0.006 Kcal/mhr° C. or less, thereby exhibiting excellent vacuum insulation performance. On the contrary, Comparative Example 1 had a thermal conductivity of 0.01 Kcal/mhr° C., which is about half that of general polyurethane (PU) foam, thereby exhibiting significant deterioration in vacuum insulation performance. Furthermore, since the graph shows a linear increase in thermal conductivity, it could easily be predicted that variations in thermal conductivities of Example 2 and Comparative Example 2 would be similar to those of Example 1 and Comparative Example 1.

Unlike the vacuum insulation panels according to the examples, the vacuum insulation panels according to Comparative Examples 3 to 6 did not include the surface protective layer in the outer cover. In Comparative Examples 3 and 4, the outer cover did not include a Nylon film, and in Comparative Example 5, 6, the outer cover did not include a PVDC coating layer and a PET film. Referring to Table 1, it could be seen that the vacuum insulation panels according to Comparative Examples 3 to 6 underwent significant deterioration in long term durability.

Accordingly, the vacuum insulation panels according to the present invention have a structure capable of maximizing insulation performance while increasing long term durability to at least 10 years or more.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A method for manufacturing a vacuum insulation panel, comprising:
   (a) forming a core by stacking a plurality of glass fiber boards prepared using glass fiber dispersed in an inorganic binder through a papermaking process;
   (b) forming an outer cover having a laminate structure of a surface protective layer, a metal barrier layer and an adhesive layer;
   (c) forming a getter by packaging quicklime (CaO) powder in a pouch;
   (d) attaching the getter to an upper portion of the core or inserting the getter into the core; and
   (e) forming an encapsulant using the outer cover, followed by placing the core having the getter in the encapsulant and sealing the encapsulant, with a vacuum created in the encapsulant,
   wherein,
   the surface protective layer of the outer cover comprises a laminate structure of polyethyleneterephthalate (PET) and Nylon films, and
   a vinyl-based resin is coated on an upper side of the polyethyleneterephthalate (PET) film.

2. The method of claim 1, wherein the glass fiber comprises staples having a diameter of 0.1 to 10 μm.

3. The method of claim 1, wherein the inorganic binder is water glass comprised of water, silica powder and sodium hydroxide (NaOH).

4. The method of claim 1, wherein each of the glass fiber boards has a thickness of 4 to 10 mm, and 1 to 3 glass fiber boards are stacked to form the core.

5. The method of claim 1, wherein the vinyl-based resin comprises at least one selected from the group consisting of polyvinyl chloride (PVC), polyvinyl acetate (PVA), polyvinyl alcohol (PVAL), polyvinyl butyral (PVB), and polyvinylidene chloride (PVDC) resins.

6. The method of claim 1, wherein the metal barrier layer of the outer cover comprises an aluminum (Al) foil.

7. The method of claim 1, wherein the adhesive layer of the outer cover comprises at least one plastic film selected from the group consisting of high density polyethylene (HDPE), low density polyethylene (LDPE), linear low density polyethylene (LLDPE), cast polypropylene (CPP), oriented polypropylene (OPP), polyvinylidene chloride (PVDC), polyvinyl chloride (PVC), ethylene-vinyl acetate copolymer (EVA), and ethylene-vinyl alcohol copolymer (EVOH) films.

8. The method of claim 1, wherein the surface protective layer, the metal barrier layer and the adhesive layer of the outer cover are bonded to each other using a polyurethane (PU) resin.

9. The method of claim 1, wherein the quicklime (CaO) has a purity of 95% or more.

10. The method of claim 1, wherein the pouch comprises crepe paper and polypropylene (PP) impregnated non-woven fabrics.

11. The method of claim 1, wherein the encapsulant having the core received therein is evacuated to a vacuum of 0.1 to 10 Pa.

12. A vacuum insulation panel manufactured by the method of claim 1, and comprising a core, a getter and an outer cover.

13. The vacuum insulation panel of claim 12, wherein the core comprises pores having a diameter of 20 µm or less and has a porosity of 80% or more.

14. The vacuum insulation panel of claim 12, wherein the getter has a moisture absorption rate of 25% or more.

15. The vacuum insulation panel of claim 12, wherein the vacuum insulation panel has a predicted thermal conductivity of 0.006 Kcal/mhr° C. or less after 10 years.

16. A vacuum insulation panel comprising:
a core comprising a plurality of glass fiber boards stacked one above another and prepared using glass fiber dispersed in an inorganic binder through a papermaking process;
a getter attached to an upper portion of the core or inserted into the core, and formed by packaging quicklime (CaO) powder in a pouch; and
an outer cover having a laminate structure of a surface protective layer, a metal barrier layer and an adhesive layer, and sealing outer surfaces of the core and of the getter in a vacuum
wherein,
the surface protective layer of the outer cover comprises a laminate structure of polyethyleneterephthalate (PET) and Nylon films, and
a vinyl-based resin is coated on an upper side of the polyethyleneterephthalate (PET) film.

* * * * *